(12) United States Patent
Sakai et al.

(10) Patent No.: US 8,760,784 B2
(45) Date of Patent: Jun. 24, 2014

(54) MAGNETIC RECORDING/REPRODUCTION DEVICE AND MAGNETIC RECORDING MEDIUM

(75) Inventors: Toshihiko Sakai, Osaka (JP); Yoshiteru Murakami, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 291 days.

(21) Appl. No.: 13/157,646

(22) Filed: Jun. 10, 2011

(65) Prior Publication Data

US 2011/0317304 A1 Dec. 29, 2011

(30) Foreign Application Priority Data

Jun. 28, 2010 (JP) ................................ 2010-145932

(51) Int. Cl.
*G11B 5/09* (2006.01)
(52) U.S. Cl.
USPC .................. 360/48; 360/29; 360/31; 360/62; 360/75; 360/77.02
(58) Field of Classification Search
None
See application file for complete search history.

(56) References Cited

U.S. PATENT DOCUMENTS

| | | | |
|---|---|---|---|
| 5,766,718 A | 6/1998 | Matsuda et al. | |
| 5,886,844 A | 3/1999 | Shimizu | |
| 6,602,620 B1* | 8/2003 | Kikitsu et al. | 428/842.2 |
| 6,977,108 B2* | 12/2005 | Hieda et al. | 428/64.2 |
| 7,079,340 B2* | 7/2006 | Igaki et al. | 360/39 |
| 7,492,540 B2* | 2/2009 | Albrecht | 360/51 |
| 7,894,155 B2* | 2/2011 | Sakurai et al. | 360/75 |
| 7,948,708 B2* | 5/2011 | Messner et al. | 360/77.08 |
| 7,974,036 B2* | 7/2011 | Lee et al. | 360/51 |
| 8,059,352 B2* | 11/2011 | Bandic et al. | 360/48 |
| 8,300,340 B2* | 10/2012 | Sakurai et al. | 360/48 |
| 8,625,229 B2* | 1/2014 | Albrecht et al. | 360/75 |
| 2007/0189418 A1* | 8/2007 | Takai | 375/316 |
| 2011/0286125 A1* | 11/2011 | Lille et al. | 360/31 |

FOREIGN PATENT DOCUMENTS

| | | |
|---|---|---|
| JP | 60-074125 | 4/1985 |
| JP | 04-001922 | 1/1992 |
| JP | 08-102001 | 4/1996 |
| JP | 2003-151103 | 5/2003 |
| JP | 2006-031757 | 2/2006 |
| JP | 2009-158013 | 7/2009 |
| JP | 2009-266379 | 11/2009 |
| JP | 2010-020851 | 1/2010 |

* cited by examiner

*Primary Examiner* — Dismery Mercedes
(74) *Attorney, Agent, or Firm* — Edwards Wildman Palmer LLP; David G. Conlin; Steven M. Jensen

(57) ABSTRACT

Disclosed is a magnetic recording/reproduction device 2 including: a recording/reproduction head 7; and a recording/reproduction head 7 for detecting a leakage magnetic field of each of the plurality of magnetic recording cells 1 so as to reproduce information, the recording/reproduction head 7 carrying out the recording on the magnetic recording medium 4 so that the magnetic recording medium 4 includes continuous recording regions that (i) satisfy $N_{min} \geq 2$ and that (ii) include a continuous recording region that satisfies $N \neq n \times N_{min}$, where N represents a number of magnetic recording cells 1 in a continuous recording region; $N_{min}$ represents a minimum value for N; and n represents a positive integer, the continuous recording regions each being a region on a reproduction track in which region magnetic recording cells 1 sharing an identical magnetization direction are sequentially arranged in a circumferential direction of the magnetic recording medium 4.

4 Claims, 13 Drawing Sheets

F I G. 1
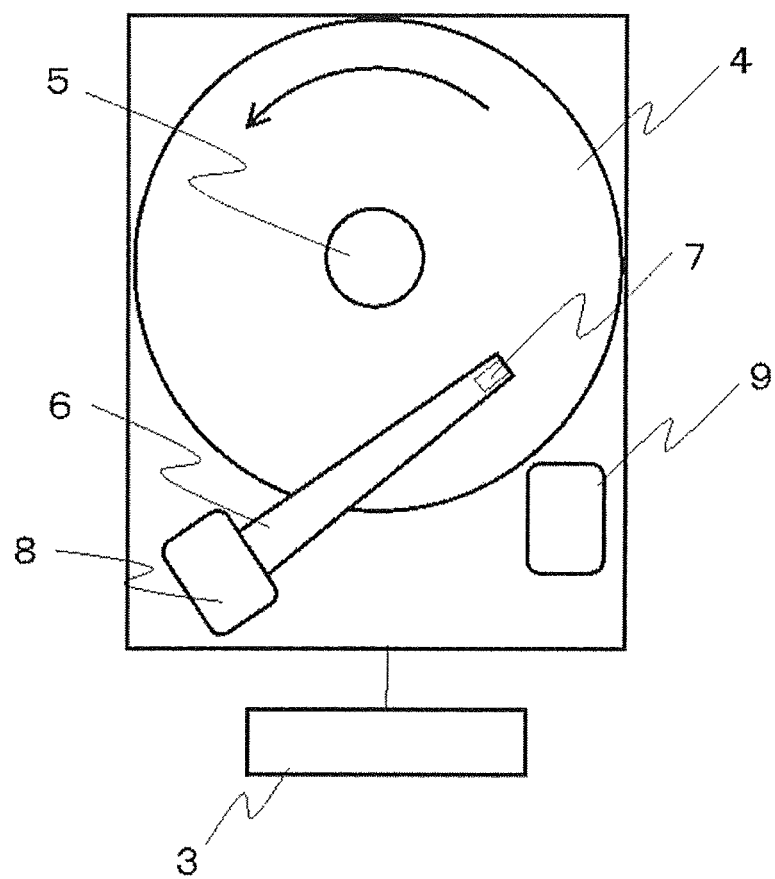

F I G. 7 (a)
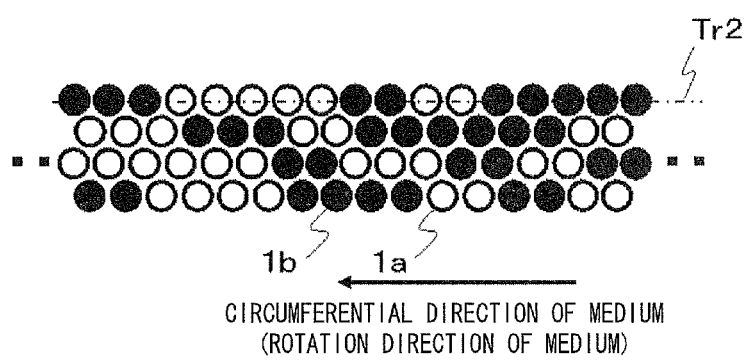
CIRCUMFERENTIAL DIRECTION OF MEDIUM
(ROTATION DIRECTION OF MEDIUM)
F I G. 7 (b)
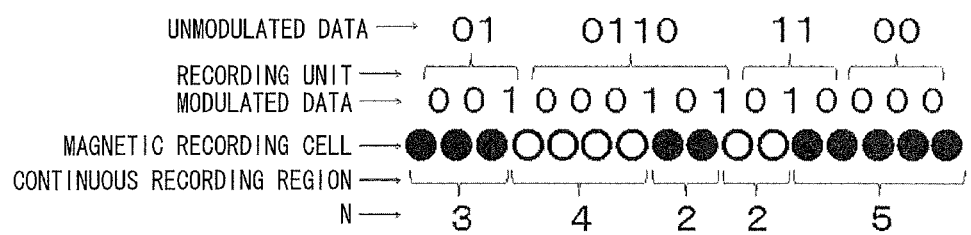

CIRCUMFERENTIAL DIRECTION OF MEDIUM
(ROTATION DIRECTION OF MEDIUM)

F I G. 1 4 (a)
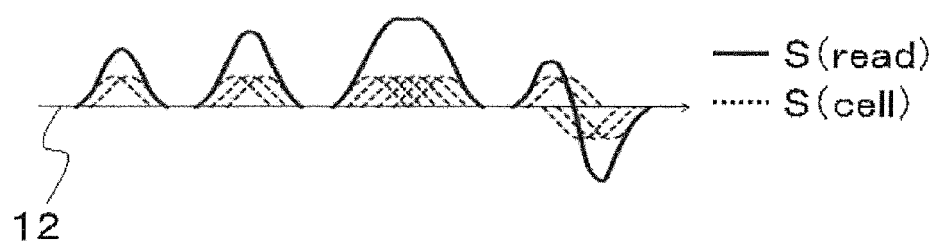
F I G. 1 4 (b)
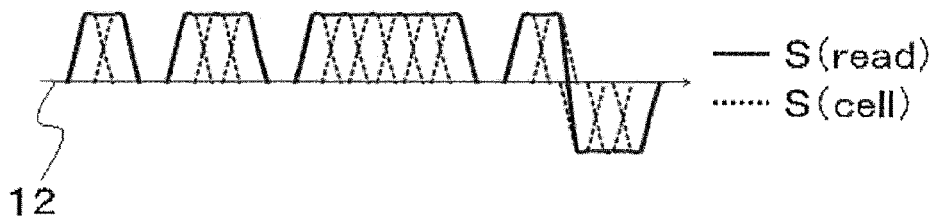
F I G. 1 4 (c)
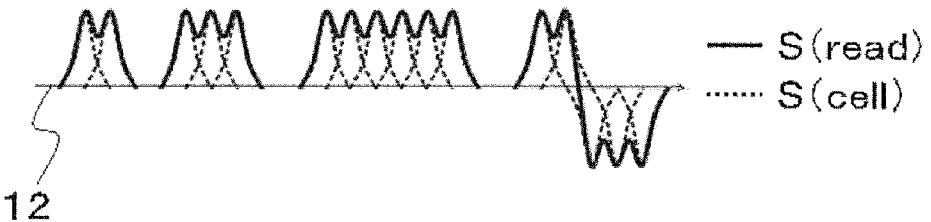

MAGNETIC RECORDING/REPRODUCTION DEVICE AND MAGNETIC RECORDING MEDIUM

This Nonprovisional application claims priority under 35 U.S.C. §119(a) on Patent Application No. 2010-145932 filed in Japan on Jun. 28, 2010, the entire contents of which are hereby incorporated by reference.

TECHNICAL FIELD

The present invention relates to a magnetic recording/reproduction device which records data on and reproduces data from a recording medium. In particular, the present invention relates to a magnetic recording/reproduction device that uses a recording medium on which data can be recorded with a high density.

BACKGROUND ART

There has been rapid improvement in function of information equipment such as a personal computer in recent years. This rapid improvement has in turn increased an amount of data that a user of such information equipment handles. Users of the information equipment thus strongly hope for a mass storage recording device which can record a larger amount of data.

An example of such a mass storage recording device is a recording device including a hard disk. A hard disk is a discoid substrate having a surface which is coated with a magnetic material. A hard disk records information by means of a change caused by a magnetic recording element to a magnetization direction in a magnetic layer on the disc surface.

For production of a mass storage recording device, there is a key issue of improvement in recording density of a hard disk as a recording medium. Specifically, a conventional hard disk as mentioned above includes on a surface thereof a magnetic layer formed uniformly and continuously. Such a magnetic layer includes as a data write unit a recording mark having a jagged edge, which causes noise (transition noise) during reproduction. The noise then causes a problem that a S/N ratio (signal to noise ratio) is decreased, and that recorded information cannot be reproduced properly as a result.

Improving a recording density requires reducing a size of a recording mark itself. In a conventional hard disk, recording marks are formed in a uniformly formed magnetic layer. Thus, in a case where the size of such recording marks is reduced so as to increase a recording density, there occurs a magnetic interference between the recording marks. As a result, there occurs, for example, a problem that information cannot be recorded properly or recorded information cannot be reproduced properly.

One technique to solve the above problems is a patterned medium. A patterned medium is a magnetic recording medium which includes magnetic recording cells arranged so as to be magnetically isolated from one another. Such magnetic recording cells are formed of particles of a magnetic material which particles are regularly arranged on a surface of a nonmagnetic body so as to be evenly spaced with respect to one another. Magnetic information is recorded in the magnetic recording cells, each of which has an edge corresponding to the above-mentioned edge of a recording mark. With use of a patterned medium, it is possible to easily achieve a high S/N ratio even in a case where the recording marks are small. As such, in a case a patterned medium is used as a recording medium, it is possible to reduce (i) noise during reproduction and (ii) a magnetic interference between recording marks so as to greatly improve a recording density.

A high-density magnetic recording medium such as a patterned medium includes magnetic recording cells which are separated from one another by an extremely small pitch of approximately several tens of nanometers. This causes a problem that a recording error easily occurs due to a mere, slight shift in location between (i) a magnetic recording element included in a recording/reproduction head which is carrying out recording and (ii) a targeted magnetic recording cell. In particular, in a case where 1-bit data is recorded in each magnetic recording cell, it is difficult to correct during reproduction a recording error which has occurred in a single magnetic recording cell. Further, a magnetically isolated magnetic recording cell may become defective on its own. In a case where, for example, a magnetic recording cell becomes defective, the recording medium will include a magnetic recording cell in which no information can be recorded. This prevents the recording medium from recording information properly. In this case also, it is difficult to carry out error correction during reproduction.

In order to solve this problem, Patent Literature 1, for example, discloses a method of recording 1-bit data in a plurality of cells so that error correction can be carried out. This method thus intends to eliminate an influence of a write error.

CITATION LIST

Patent Literature 1
Japanese Patent Application Publication, Tokukai, No. 2003-151103 A

SUMMARY OF INVENTION

Technical Problem

The method of Patent Literature 1, however, simply increases the number of magnetic recording cells per bit so that error correction can be carried out. This indicates that the method greatly decreases a recording density. For example, supposing that the number of magnetic recording cells per 1-bit user data is M, the recording density is one-Mth.

The present invention has been accomplished in view of the above problem. It is an object of the present invention to provide a magnetic recording/reproduction device which can (i) correct a reproduction error caused by a defective magnetic recording cell and yet (ii) prevent a decrease in recording density.

Solution to Problem

A magnetic recording and reproduction device of the present invention includes: recording means for generating a magnetic field so as to record information in a plurality of magnetic recording cells which are arranged on a recording surface of a magnetic recording medium and which are magnetically isolated from one another; and reproducing means for detecting a leakage magnetic field of each of the plurality of magnetic recording cells so as to reproduce information, the recording means carrying out the recording on the magnetic recording medium so that the magnetic recording medium includes continuous recording regions that (i) satisfy $N_{min} \geq 2$ and that (ii) include a continuous recording region that satisfies $N \neq n \times N_{min}$, where N represents a number of magnetic recording cells in a continuous recording region; $N_{min}$ represents a minimum value for N; and n represents a positive integer, the continuous recording regions each being a region on a reproduction track in which region magnetic recording cells sharing an identical magnetization direction are sequentially arranged in a circumferential direction of the magnetic recording medium.

A the magnetic recording medium includes a test read region which allows the reproducing means to measure spatial distributions, in the circumferential direction, of respective signals detected individually from the plurality of magnetic recording cells.

Advantageous Effects of Invention

The magnetic recording and reproduction device of the present invention is a magnetic recording and reproduction device which can (i) correct a reproduction error caused by a defective magnetic recording cell and yet (ii) prevent a decrease in recording density.

BRIEF DESCRIPTION OF DRAWINGS

FIG. 1 is a diagram illustrating an internal configuration of a magnetic recording/reproduction device.

FIG. 7a is a diagram schematically illustrating (i) an arrangement of a part of the magnetic recording medium of the first embodiment and (ii) some of the magnetic recording cells.

FIG. 7b is a diagram schematically illustrating (i) an arrangement of a part of the magnetic recording medium of the first embodiment and (ii) some of the magnetic recording cells.

FIG. 14a is a diagram illustrating intersymbol interference occurring in a magnetic recording/reproduction device of the third embodiment.

FIG. 14b is a diagram illustrating intersymbol interference occurring in the magnetic recording/reproduction device of the third embodiment.

FIG. 14c is a diagram illustrating intersymbol interference occurring in the magnetic recording/reproduction device of the third embodiment.

DESCRIPTION OF EMBODIMENTS

Figure 2:
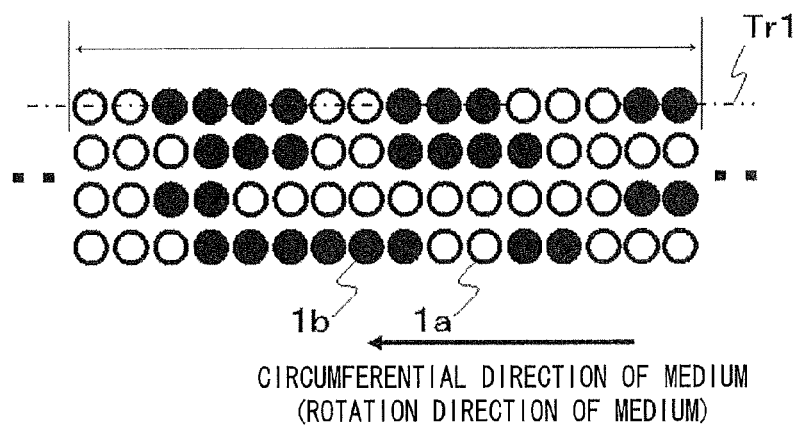
FIG. 2 is a diagram illustrating how magnetic recording cells are arranged in a magnetic recording medium of a first embodiment.

Embodiments of the present invention are described below. In the drawings referred to for explanation of the present invention, members with an identical reference numeral are identical or corresponding to each other.

First Embodiment

A first embodiment of the present invention is described below with reference to FIGS. 1 through 7.

<Configuration>

FIG. 1 is a diagram illustrating an internal configuration of a magnetic recording/reproduction device 2. As illustrated in FIG. 1, the magnetic recording/reproduction device 2 includes: a control section 3 for controlling an operation of the magnetic recording/reproduction device 2; a spindle motor (not shown) for driving a spindle 5 serving to rotate a magnetic recording medium 4 having a discoid shape; a spindle control section (not shown) for controlling an operation of the spindle motor in accordance with control by a controller; a recording/reproduction head 7 provided on an end of a suspension 6 so as to record magnetic information on and reproduce magnetic information from the magnetic recording medium 4; a VCM (voice coil motor) 8 for driving the suspension 6 so that the recording/reproduction head 7 moves in a radial direction of the magnetic recording medium 4 as combined with the spindle 5; and a ramp mechanism 9 provided at a location at which the recording/reproduction head 7 can rest away.

The control section 3 includes a head location control section (not shown). The head location control section computes information about a location of the recording/reproduction head 7 on the basis of a signal detected by a magnetic reproduction element. The head location control section thus transmits a movement instruction to the VCM 8 so as to control a radial location of the recording/reproduction head 7 relative to the magnetic recording medium 4.

The magnetic recording medium 4 in the discoid shape has, at a central portion thereof, a hole section through which the spindle 5 can be fitted with the magnetic recording medium 4. The spindle 5 thus fitted with the magnetic recording medium 4 rotates the magnetic recording medium 4 in a direction indicated by an arrow in FIG. 1.

FIG. 2 is an enlarged view of a portion of the magnetic recording medium 4. FIG. 2 illustrates recording tracks arranged next to each other in the radial direction each of which recording tracks includes magnetic recording cells 1 arranged in a circumferential direction of the magnetic recording medium 4 so as to be evenly spaced with respect to one another. The magnetic recording cells 1 include magnetic recording cells 1a and magnetic recording cells 1b. The magnetic recording cells 1a each have a magnetization direction which extends upward, that is, from a back side of FIG. 2 toward a front side thereof. The magnetic recording cells 1b each have a magnetization direction which extends downward, that is, from the front side of FIG. 2 toward the back side thereof. The upward and downward magnetization directions correspond to the below-described "1" and "0" of modulated data, respectively.

Figure 3:
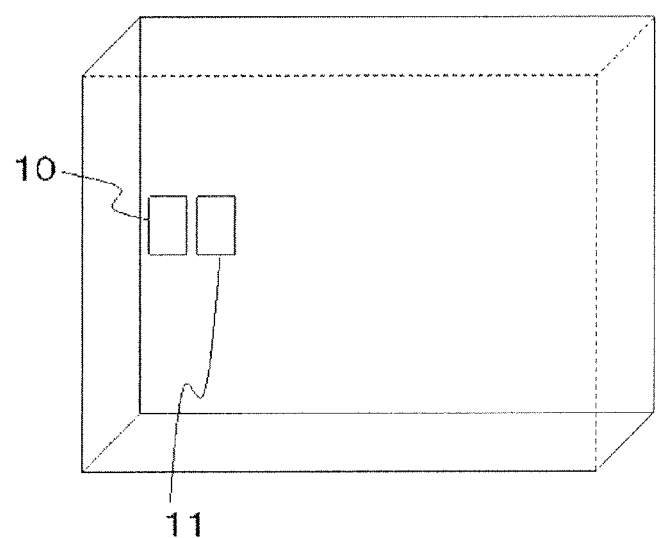
FIG. 3 is a diagram schematically illustrating a configuration of a recording/reproduction head.

FIG. 3 is a view schematically illustrating a configuration of the recording/reproduction head 7. The recording/reproduction head 7 includes a magnetic recording element 10 and a magnetic reproduction element 11. The magnetic recording element 10 generates a magnetic field so as to record information on the magnetic recording medium 4. The magnetic reproduction element 11 detects a magnetic field so as to reproduce information recorded on the magnetic recording medium 4. The recording/reproduction head 7 is described later in more detail.

The magnetic recording/reproduction device 2 includes a memory section (not shown) which stores information about the magnetic recording element 10 included in the recording/reproduction head 7. The information includes, for example, (i) a strength and pulse width of a magnetic field which the magnetic recording element 10 generates and (ii) timing at which the magnetic recording element 10 generates such a magnetic field. The memory section further stores, for example, a table which associates, with an amount of movement of the recording/reproduction head 7 in the radial direction, (i) a signal amplitude for determining a track which the magnetic reproduction element 11 included in the recording/reproduction head 7 is to follow, (ii) a signal amplitude for determining a region, (iii) information about a position of the recording/reproduction head 7, and (iv) a signal amplitude.

The head location control section carries out radial location control on the basis of feedback control, and thus carries out tracking control so that the recording/reproduction head 7 follows a predetermined track to carry out recording and reproduction. More specifically, the head location control section (i) detects, on the basis of a waveform of a signal detected by the magnetic reproduction element 11, a servo pattern recorded on the magnetic recording medium 4, and (ii) refers to position information and identification information of the servo pattern, so as to determine an amount and direction of off-track of the recording/reproduction head 7 for head location control.

The magnetic recording/reproduction device 2 further includes a suspension 6. The suspension 6 has a first end having a bottom surface on which the recording/reproduction head 7 is provided. Further, the suspension 6 is driven by the VCM 8 so as to rotate with its second end serving as a center. The magnetic recording/reproduction device 2 further includes a ramp mechanism 9 provided at a location at which the recording/reproduction head 7 can rest away.

The suspension 6 is driven by the VCM 8 so that the first end thereof moves in the radial direction over the magnetic recording medium 4. The recording/reproduction head 7, which is provided on the first end of the suspension 6, can change its location in the radial direction of the magnetic recording medium 4 in accordance with an operation of the VCM 8.

The following description deals in detail with the recording/reproduction head 7 with reference to FIGS. 1 and 3. The recording/reproduction head 7 includes on a first surface thereof a magnetic recording element 10 and a magnetic reproduction element 11, the first surface facing and being close to the magnetic recording medium 4. The magnetic recording element 10 applies to the magnetic recording medium 4 a magnetic field perpendicular to the magnetic recording medium 4. The magnetic reproduction element 11 detects a magnetic field on the magnetic recording medium 4, and thus outputs an electric signal.

The magnetic recording element 10, when recording information on the magnetic recording medium 4, applies a magnetic field having a strength sufficient to record information. The magnetic field thus applied can vary in direction. The description of the present embodiment uses (i) the term "upward direction" to refer to a magnetic field direction which extends from a back side of FIG. 1 toward a front side thereof, and (ii) the term "downward direction" to refer to a magnetic field direction which extends from the front side of FIG. 1 toward the back side thereof. A magnetic field in either the downward direction or the upward direction is applied to the magnetic recording medium 4 to record information thereon.

The magnetic recording element 10 and the magnetic reproduction element 11 as viewed from the magnetic recording medium 4 have the following positional relationship in a circumferential direction of the magnetic recording medium 4: When the recording/reproduction head 7 passes over a given location on the magnetic recording medium 4 being in a rotating motion, the magnetic reproduction element 11 passes over the given location first so that tracking is carried out, and the magnetic recording element 10 passes over the given location next. With this arrangement, the magnetic reproduction element 11 of the recording/reproduction head 7 first detects a signal and outputs the signal thus detected, and while the control section 3 carries out tracking in accordance with the detected signal, the magnetic recording element 10 records information.

The following description deals with how the magnetic recording/reproduction device 2 records magnetic information on and reproduces magnetic information from the magnetic recording medium 4. The magnetic reproduction element 11 of the magnetic recording/reproduction device 2 of the present embodiment outputs a zero-level signal in a case where no magnetization is present in a magnetization detection region of the magnetic recording medium 4. In contrast, the magnetic reproduction element 11 outputs (i) a positive signal in a case where magnetization in the upward direction is present in a magnetization detection region, and (ii) a negative signal in a case where magnetization in the downward direction is present in a magnetization detection region.

As illustrated in FIG. 2, the magnetic recording medium 4 is a patterned, magnetic recording medium including a plurality of columnar magnetic recording cells 1 isolated from one another. The term "magnetic recording cells 1" as used hereinafter refers to a collection of (i) magnetic recording cells 1a each having a magnetization direction extending from the back side of FIG. 2 toward the front side thereof and (ii) magnetic recording cells 1b each having a magnetization direction extending from the front side of FIG. 2 toward the back side thereof. Further, the description below refers to the magnetization direction of the magnetic recording cells 1a as "upward direction" and the magnetization direction of the magnetic recording cells 1b as "downward direction." The magnetic recording medium 4 records information by means of magnetization in a direction perpendicular to an in-plane direction of the magnetic recording medium 4.

The magnetic recording medium 4 includes (i) a first region in which user data can be recorded and (ii) a preset servo pattern region (not shown) having an unchanged magnetization direction. The magnetic recording cells 1 are provided in the first region. The recording/reproduction head 7 records magnetic information in and reproduces magnetic information from the first region. The servo pattern region, which has an unchanged magnetization direction, serves to, for example, provide a signal for detecting a tracking servo pattern or the like.

In the present embodiment, the magnetic recording medium 4 is rotated in a direction indicated by an arrow in FIG. 2. The magnetic reproduction element 11 thus detects respective signals of the magnetic recording cells 1 in the magnetic recording medium 4 sequentially from left to right in FIG. 2.

The following description deals with an example method for producing the magnetic recording medium 4.

FIGS. 4a through 4d are each a diagram illustrating a method for producing the magnetic recording medium 4.

Figure 4A:
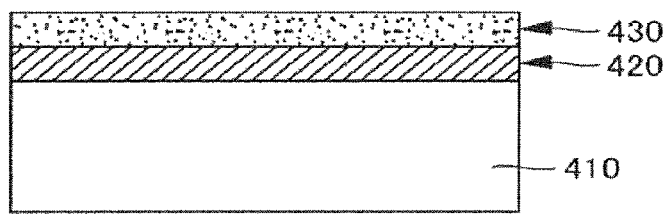
FIG. 4a is a diagram illustrating a method for producing a magnetic recording medium.
Figure 4B:
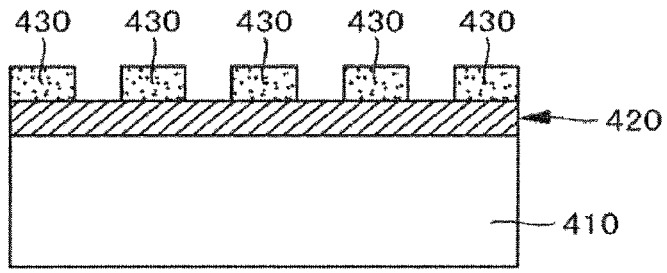
FIG. 4b is a diagram illustrating the method for producing a magnetic recording medium.
Figure 4C:
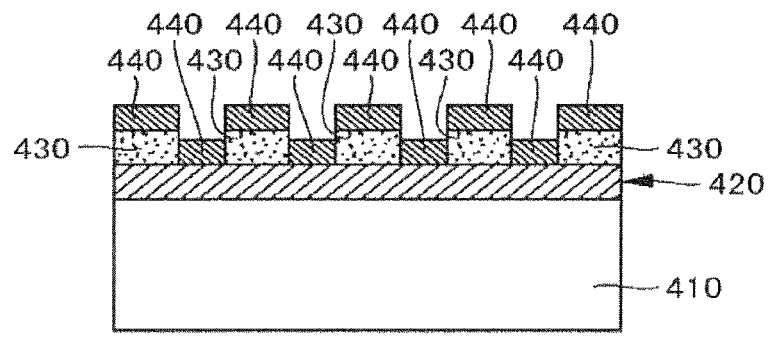
FIG. 4c is a diagram illustrating the method for producing a magnetic recording medium.
Figure 4D:
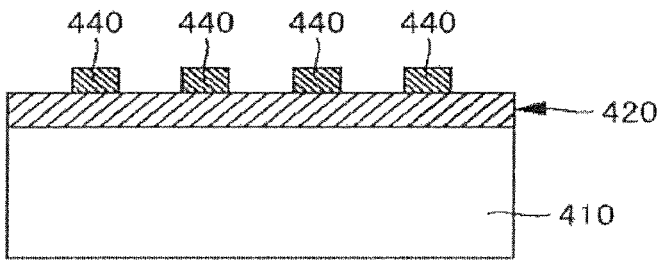
FIG. 4d is a diagram illustrating the method for producing a magnetic recording medium.

First, a soft magnetic layer 420 is formed on a glass substrate 410, and resist 430 is applied onto the soft magnetic layer 420 (see FIG. 4a).

Next, a fine pattern is formed in the resist 430. The fine pattern refers to a pattern of magnetic recording cells 1 to be formed over a surface of the magnetic recording medium 4 so as to be magnetically isolated from one another. The production of the magnetic recording medium 4 uses the fine pattern so as to form circles each 25 nm in diameter and thus to form columnar magnetic recording cells 1. The fine pattern is formed by, for example, electron-beam lithography, in which (i) an electron ray is emitted to a desired location on the resist and (ii) a developing process is carried out with respect to the resist so that a desired pattern is formed in the resist. The developing process in electron-beam lithography removes a portion of the resist which portion has been exposed to the electron ray. The fine pattern is thus formed in the resist (see FIG. 4b).

After the fine pattern is formed as above, a film of a material 440 is formed over the resist 430 and a portion of the soft magnetic layer 420. The material 440 is a material (for example, Co) of which magnetic recording cells 1 are to be made. The material 440 is partially present in a region of the soft magnetic layer 420 from which region the above portion of the resist 430 has been removed (see FIG. 4c).

Then, (i) a remaining portion of the resist 430 and (ii) a portion of the material 440 which portion has been deposited on the remaining portion of the resist 430 are removed with use of, for example, an organic solvent. This process does not remove a remaining portion of the material 440 which remaining portion has been deposited directly on the soft magnetic layer 420 (see FIG. 4d). This remaining portion of the material 440 forms magnetic recording cells 1.

After the remaining portion of the resist 430 and the portion of the material 440 which portion has been deposited on the remaining portion of the resist 430 are removed as above, a nonmagnetic layer is formed over the substrate 410. The resultant substrate is then polished on a surface having the nonmagnetic layer so that (i) the magnetic recording cells 1 are exposed on the surface and that (ii) the substrate has a smooth surface. Finally, lubricant is applied to the substrate having the magnetic recording cells 1 formed therein.

The above method for producing the magnetic recording medium 4 involves use of Co as a material of which magnetic recording cells 1 are to be made. The material can, however, alternatively be (i) another metal, for example, Pt, Fe, Ni, Cr, or Mn, or (ii) an alloy of these metals, for example, CoPt, SmCo, CoCr, or TbFeCo. Further, the fine pattern can alternatively be formed in the resist by, instead of electron-beam lithography mentioned above, a method such as anodic oxidation, photolithography, and nanoimprint.

The above method for producing the magnetic recording medium 4 forms a magnetic recording surface, which has magnetic recording cells 1 formed therein, only on one of opposite surfaces of the magnetic recording medium 4. The present invention is, however, not limited to this. A magnetic recording surface can alternatively be formed on each of the opposite surfaces of the magnetic recording medium 4. In this case, the above production method can simply be carried out with respect to each of the opposite surfaces of the magnetic recording medium 4. Lubricant can in this case be applied simultaneously to both the magnetic recording surfaces formed on the respective opposite surfaces of the magnetic recording medium 4.

<Operation>

The following description deals with the magnetic recording/reproduction device 2 of the first embodiment.

Data is normally modulated before being recorded on a medium. Data can be modulated by any of various methods such as NRZI method, FM method, and RLL method. Japanese Patent Application Publication, Tokukaishou, No. 60-74125 A, for example, discloses a RLL coding method which encodes data so that the number of consecutive 0's does not exceed a predetermined value. For a patterned medium also, data is modulated before being recorded.

The present embodiment (i) encodes modulated user data so that the magnetic recording medium 4 has a continuous recording region including three magnetic recording cells 1, and thus (ii) records the encoded data on the magnetic recording medium 4. The magnetic recording medium 4 records information upon application of a magnetic field in a downward direction or of a magnetic field in an upward direction. The downward direction refers to a first direction of a magnetic field applied for magnetization which first direction extends from a front side of a drawing referred to below to a back side thereof. The upward direction refers to a second direction of a magnetic field applied for magnetization which second direction extends from the back side of the drawing referred to below to the front side thereof. In addition to the direction of a magnetic field, the magnetization direction of a magnetic recording cell 1 in which information has been recorded is also expressed by either a downward direction (that is, the first direction) or an upward direction (that is, the second direction).

Figure 5:
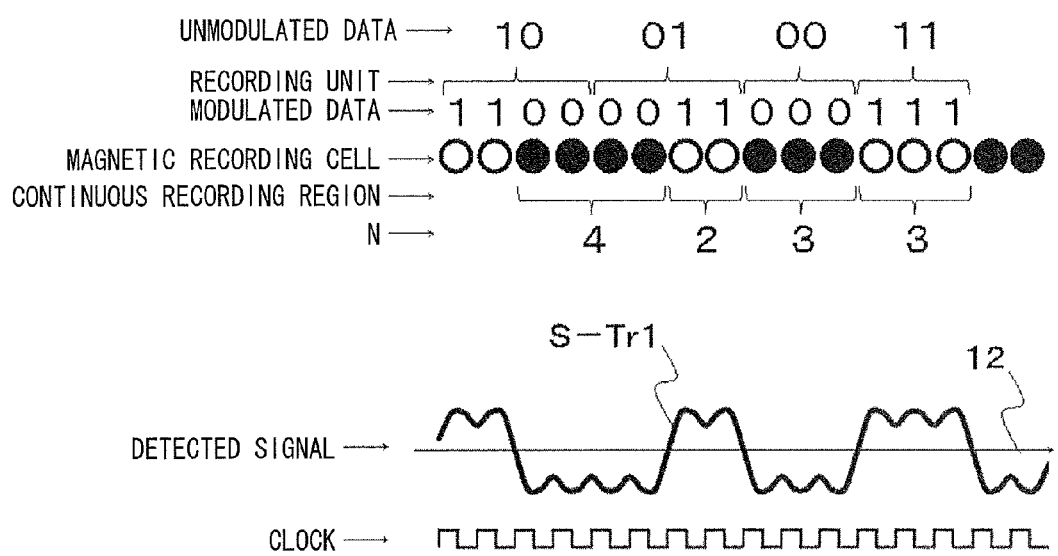
FIG. 5 is a diagram illustrating (i) some of the magnetic recording cells of the magnetic recording medium of the first embodiment and (ii) a detection signal.

FIG. 5 is a diagram schematically illustrating (i) particular ones of the magnetic recording cells 1 of the magnetic recording medium 4 included in the magnetic recording/reproduction device 2 of the present embodiment and (ii) a signal detected from the particular magnetic recording cells 1. In the present embodiment, data before modulation (user data; hereinafter also referred to as "unmodulated data") represented by "1" and "0" is first divided into portions each including two digits. Then, the portions are modulated into modulated data so that magnetic recording cells 1 in which the modulated data has been recorded will form continuous recording regions that (i) satisfy $N_{min} \geq 2$ and that (ii) include continuous recording regions that satisfy $N \neq n \times N_{min}$, as in 2 ($=N_{min}$), 3($\neq$n×$N_{min}$), 4 (=n×$N_{min}$), 5($\neq$n×$N_{min}$) ..., where N represents the number of magnetic recording cells included in a continuous recording region. In the present embodiment, data is recorded in the magnetic recording medium 4 as above so that the magnetic recording medium 4 includes continuous recording regions that (i) satisfy $N_{min}$≥2 and that (ii) include continuous recording regions that satisfy N$\neq$n×$N_{min}$. In the present embodiment, data is recorded in the magnetic recording medium 4 more specifically so that the magnetic recording medium 4 includes continuous recording regions that (iii) satisfy $N_{min}$=3 and that (iv) include continuous recording regions that satisfy (iv) $N_{min}$<N<2×$N_{min}$.

Table 1 shows correspondence of (i) unmodulated data (user data), (ii) corresponding modulated data, and (iii) respective magnetization directions of corresponding magnetic recording cells 1. As shown in Table 1, modulated data is recorded so that "1" and "0" correspond to upward ("U") and downward ("D") magnetization directions, respectively.

TABLE 1

| Unmodulated data | Modulated data | Magnetization directions of magnetic recording cells |
| --- | --- | --- |
| 10 | 1100 | UUDD |
| 01 | 0011 | DDUU |
| 11 | 111 | UUU |
| 00 | 000 | DDD |

In a case where, for example, unmodulated data is "10010011", it is modulated into "11000011000111." Then, the magnetic recording element 10 generates magnetic fields sequentially in the directions "U, U, D, D, D, D, U, U, D, D, D, U, U, U" so as to magnetize magnetic recording cells 1 sequentially in the above-specified directions (as indicated by a track Tr1 of FIG. 2; see FIG. 5 as well) while moving, relative to the magnetic recording medium 4, from the leftmost magnetic recording cell 1 in FIGS. 2 and 5 to the right. As such, the magnetization directions of the respective magnetic recording cells 1 are "U, U, D, D, D, D, U, U, D, D, D, U, U, U" from left to right in FIGS. 2 and 5. N for a continuous recording region may be 5 or greater depending on an order of digits in data, although the track Tr1 in FIG. 2 includes no such continuous recording region. In a case where unmodulated data includes "10," "01," "11," and "00" in proportions which are identical to one another, it is "1-bit unmodulated data/1.75 cells," which indicates that (i) the number of magnetic recording cells needed to record 1-bit data is smaller in the present embodiment than in Patent Literature 1 (disclosing "1-bit unmodulated data/2 cells"), and that (ii) the present embodiment consequently allows high-density recording.

The detection signal illustrated in FIG. 5 is a signal obtained when the magnetic reproduction element 11 reproduces information on the magnetic recording medium 4 along the recording track Tr1 (that is, a line of magnetic recording cells illustrated in FIG. 5) indicated by a dashed line in FIG. 2. The magnetic reproduction element 11 carries out the reproduction by detecting leakage magnetic fields from the respective magnetic recording cells 1 sequentially from left to right in FIG. 5. FIG. 5 shows a curve and a coordinate axis. The curve has (i) a first portion above the coordinate axis which first portion indicates detection of a positive signal for a magnetic recording cell having an upward magnetization direction, (ii) a second portion below the coordinate axis which second portion indicates detection of a negative signal for a magnetic recording cell having a downward magnetization direction, and (iii) a third portion on the coordinate axis which third portion indicates detection of a zero-level signal.

A clock signal generated on the basis of the detection signal has a clock cycle which basically corresponds to "(pitch of the magnetic recording cells 1 in the circumferential direction)/(scanning speed of the magnetic reproduction element 11 in the circumferential direction)." The clock signal can be generated by the magnetic reproduction element 11 (i) in accordance with a signal detected from magnetic recording cells in a region in which user data is recorded, or (ii) in accordance with a signal detected from a synchronization signal generating pattern provided separately from magnetic recording cells. The clock signal allows a level of a signal from magnetic recording cells to be determined for each magnetic recording cell even in a case where the detection signal has a continuous waveform due to intersymbol interference. In other words, the clock signal allows accurate determination of the number of magnetic recording cells which generate a signal detected in a particular continuous recording region. As such, it is possible to more accurately carry out reproduction. In a case where, for example, recorded modulated data is "1001," it is possible to reduce a risk of a reproduction error in which the modulated data is erroneously determined as "101" or "10001."

In addition, it is possible to more accurately carry out recording by carrying out control so that the magnetic recording element 10 generates, in accordance with a clock signal generated as above, magnetic fields at timing corresponding to individual magnetic recording cells formed in advance on the magnetic recording medium 4.

The following description deals with how a reproduction signal is corrected in a case where the magnetic recording cells 1 include a defective cell.

Figure 6A:
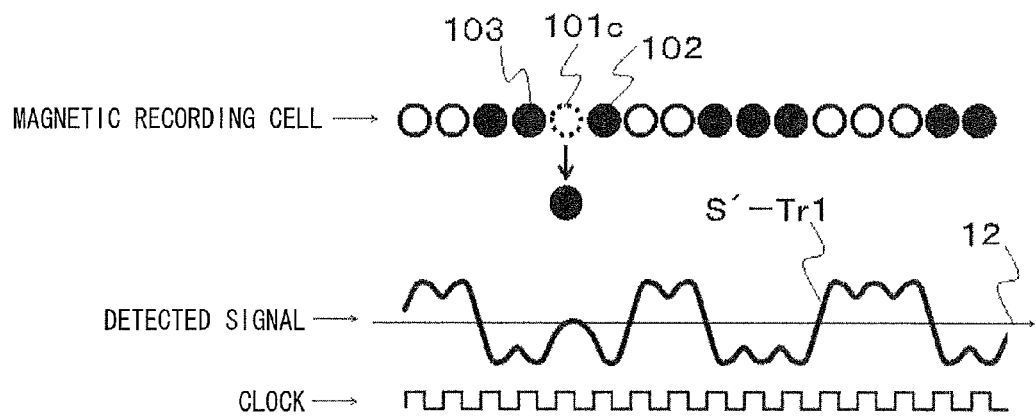
FIG. 6a is a diagram schematically illustrating (i) some of the magnetic recording cells of the magnetic recording medium of the first embodiment and (ii) an error correction method of the first embodiment.
Figure 6B:
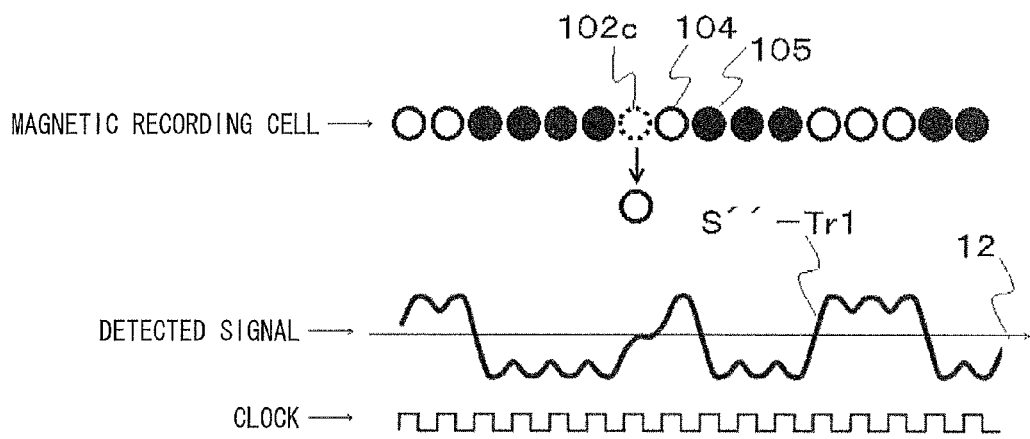
FIG. 6b is a diagram schematically illustrating (i) some of the magnetic recording cells of the magnetic recording medium of the first embodiment and (ii) an error correction method of the first embodiment.

FIGS. 6a and 6b are each a diagram schematically illustrating (i) particular ones of the magnetic recording cells 1 of the first embodiment and (ii) an error correction method. As illustrated in FIG. 6a, the correction method of the present embodiment is employed in a case where the magnetic reproduction element 11 has detected a defective cell 101c, for which a magnetization direction cannot be determined. FIG. 6a indicates a detected waveform by S'-Tr1. Further, FIG. 6a supposes a case in which two magnetic recording cells 102 and 103 adjacent to the defective cell 101c in the circumferential direction share an identical magnetization direction. If the defective cell 101c differed from the magnetic recording cells 102 and 103 in magnetization direction, it would mean that the magnetic recording medium 4 has a continuous recording region of which N (number of magnetic recording cells included) is 1. The magnetic recording medium 4 included in the magnetic recording/reproduction device 2 of the present invention, however, includes no such continuous recording region. This indicates that the defective cell 101c is identical to the magnetic recording cells 102 and 103 in magnetization direction. As such, it is possible to (i) determine that a detected reproduction signal has a waveform identical to that of the signal illustrated in FIG. 5, and thus to (ii) decode recorded data.

FIG. 6b deals with a case in which the magnetic reproduction element 11 has detected a defective cell 102c, for which a magnetization direction cannot be determined. FIG. 6b indicates a detected waveform by S"-Tr1. FIG. 6b illustrates (i) a magnetic recording cell 104, which is one of two magnetic recording cells adjacent to the defective cell 102c in the circumferential direction, and (ii) a magnetic recording cell 105, which is one of two magnetic recording cells adjacent to the magnetic recording cell 104 in the circumferential direction and which is opposite to the defective cell 102c. FIG. 6b supposes a case in which the magnetic recording cells 104 and 105 differ from each other in magnetization direction. If the defective cell 102c differed from the magnetic recording cell 104 in magnetization direction, it would mean that the magnetic recording medium 4 has a continuous recording region of which N (number of magnetic recording cells included) is 1. The magnetic recording medium 4 included in the magnetic recording/reproduction device 2 of the present invention, however, includes no such continuous recording region. As such, it is possible to determine that the defective cell 102c and the magnetic recording cell 104 share an identical magnetization direction.

As described above, it is possible to carry out error correction even in a case where a defect is caused during the production of the magnetic recording medium 4, for example, while electron-beam lithography is being carried out, the development process is being carried out for resist, or a film is being made of the material of which magnetic recording cells 1 are to be made. Further, it is possible to carry out error correction also in a case where a magnetic recording cell 1 has lost its magnetization due to, for example, oxidation resulting from use.

A third embodiment below will describe how the magnetic reproduction element 11 determines existence of a defective cell such as the defective cells 101c and 102c from a detection signal such as the detection signals S'-Tr1 and S"-Tr1.

The method for modulating user data is not limited to the above method. For example, four kinds of pieces of unmodulated data, namely "10," "01," "11," and "00," can be modulated into four kinds of pieces of data, namely "1100," "0011," "111," and "000," in a one-to-one correspondence. As described above, in the case where the magnetic recording medium records information so as to include continuous recording regions that (i) satisfy $N_{min} \geq 2$ and that (ii) include continuous recording regions that satisfy $N \neq n \times N_{min}$, it is more likely to be able to correct a reproduction error caused by a defective cell.

(Variation 1)

Table 2 shows, as in Table 1 above, correspondence of (i) unmodulated data (user data), (ii) corresponding modulated data, and (iii) respective magnetization directions of corresponding magnetic recording cells 1. In Table 2, k (where $k \geq 2$) refers to the number of consecutive 1's or 0's in unmodulated data. With this modulation, it is possible to record information so that the magnetic recording medium 4 will include continuous recording regions in which N varies as follows: 2 ($=N_{min}$), 3 ($\neq n \times N_{min}$), 4 ($=n \times N_{min}$), 5($\neq n \times N_{min}$), 6 ($=n \times N_{min}$), .... As in the first embodiment, the magnetic recording medium 4 of the present variation records information so as to include continuous recording regions that (i) satisfy N=3 and that (ii) include continuous recording regions that satisfy $N_{min} < N < 2 \times N_{min}$.

TABLE 2

| Unmodulated data | Modulated data | Magnetization directions of magnetic recording cells |
|---|---|---|
| 1 | 11 | UU |
| 0 | 00 | DD |
| k consecutive 1's (immediately preceded and followed by 0) | (k + 1) consecutive 1's | (k + 1) consecutive U's |
| k consecutive 0's (immediately preceded and followed by 1) | (k + 1) consecutive 0's | (k + 1) consecutive D's |

In a case where, for example, unmodulated data is "11000010111110," and is immediately preceded by "0" and immediately followed by "1," resulting modulated data is "111000001100111111100." With this arrangement, in a case where k=2, 1-bit unmodulated data requires 1.5 magnetic recording cells to be recorded, and in a case where k≥3, 1-bit unmodulated data requires fewer than 1.34 magnetic recording cells to be recorded. In other words, while a shortest continuous recording region has an N of 2, it is possible to carry out recording with a density higher than "1-bit unmodulated data/2 cells."

(Variation 2)

Modulation can alternatively be carried out as described below so that a reproduction error is less likely to occur.

Table 3 shows correspondence of (i) unmodulated data (user data), (ii) corresponding modulated data, and (iii) respective magnetization directions of corresponding magnetic recording cells 1. With this modulation, it is possible to record information so that the magnetic recording medium 4 will include continuous recording regions in which N varies as follows: 2 ($=N_{min}$), 4 ($=n \times N_{min}$), 5($\neq n \times N_{min}$), 6 ($=n \times N_{min}$), 7($\neq n \times N_{min}$), ....

TABLE 3

| Unmodulated data | Modulated data | Magnetization directions of magnetic recording cells |
|---|---|---|
| 1 | 11 | UU |
| 0 | 00 | DD |
| k consecutive 1's (immediately preceded and followed by 0) | (k + 2) consecutive 1's | (k + 2) consecutive U's |
| k consecutive 0's (immediately preceded and followed by 1) | (k + 2) consecutive 0's | (k + 2) consecutive D's |

In a case where, for example, unmodulated data is "11000010111110," and is immediately preceded by "0" and immediately followed by "1," resulting modulated data is "1111000000011001111111100." With this modulation, in a case where k=2, 1-bit unmodulated data requires 2 magnetic recording cells to be recorded, and in a case where k≥3, 1-bit unmodulated data requires fewer than 1.67 magnetic recording cells to be recorded. In other words, while a shortest continuous recording region has an N of 2, it is possible to carry out recording with a density higher than "1-bit unmodulated data/2 cells."

In a case where a continuous recording region with a smaller N causes its detection signal to have a smaller amplitude, it is difficult, due to distortion of the detection signal, noise and the like, to determine on the basis of the detection signal whether N is 2 or 3. The present variation reduces a possibility of a reproduction error occurring. In variation 2, no continuous recording region satisfies N=3 (that is, $N_{min} < N < 2 \times N_{min}$). This modulation reduces a possibility that the magnetic recording/reproduction device 2 erroneously recognizes (i) a detection signal from a continuous recording region in which N is 4 as (ii) a detection signal from a continuous recording region in which N is 2, or (i) a detection signal from a continuous recording region in which N is 2 as (ii) a detection signal from a continuous recording region in which N is 4. As described above, since in variation 2, no continuous recording region satisfies $N_{min} < N < 2 \times N_{min}$, variation 2, although having a recording density lower than that in variation 1, has a lower possibility of a reproduction error occurring.

Variation 1, in contrast, carries out recording so that the magnetic recording medium 4 will include continuous recording regions that satisfy $N_{min}<N<2\times N_{min}$. As such, it is possible to reduce the number of magnetic recording cells necessary for recording 1-bit data and thus to carry out recording with a high density, as compared to variation 2. This indicates that it is possible to select a modulation method while taking into consideration a balance between improvement in recording density and prevention of error occurrence.

The embodiment and variation other than variation 2 may also each include, to prevent error occurrence, a special rule for its modulation method so that the magnetic recording medium 4 will record information so as to include no continuous recording region that satisfies $N_{min}<N<2\ N_{min}$. However, in a case where the magnetic recording medium 4 records information so as to include continuous recording regions that satisfy $N_{min}<N<2\times N_{min}$, it is possible to (i) reduce N of the continuous recording regions overall and thus to (ii) carry out recording with a higher density.

(Variation 3)

The following description deals with a third variation of the first embodiment. In the first embodiment, unmodulated data (user data) represented by "1" and "0" is (i) divided into portions each including two digits and then (ii) modulated into modulated data so that the magnetic recording cells 1 form continuous recording regions in which N varies as follows: 2 ($=N_{min}$), 3 ($\neq n\times N_{min}$), 4 ($=n\times N_{min}$), 5($\neq n\times N_{min}$), .... In contrast, modulation is carried out in the present variation so that N varies as follows: 3 ($=N_{min}$), 4 ($\neq n\times N_{min}$), 6 ($=n\times N_{min}$), 7 ($\neq n\times N_{min}$), .... In the present variation also, recording is carried out so that the continuous recording regions include continuous recording regions that satisfy $N_{min}<N<2\times N_{min}$.

Table 4 shows correspondence of (i) unmodulated data, (ii) corresponding modulated data, and (iii) respective magnetization directions of corresponding magnetic recording cells 1 in variation 3. Unmodulated data (user data) represented by "1" and "0" is (i) divided into portions each including two digits and then (ii) modulated into modulated data as shown in Table 4. The modulated data is recorded so that "1" and "0" correspond to the magnetization directions "U" and "D," respectively.

TABLE 4

| Unmodulated data | Modulated data | Magnetization directions of magnetic recording cells |
| --- | --- | --- |
| 10 | 111000 | UUUDDD |
| 01 | 000111 | DDDUUU |
| 11 | 1111 | UUUU |
| 00 | 0000 | DDDD |

Assuming that respective occurrence rates of "10," "01," "11," and "00" are identical to one another, the present variation achieves "1-bit unmodulated data/2.5 cells," indicating the number of magnetic recording cells needed to record 1-bit data, which is smaller than "1-bit unmodulated data/3 cells" of Patent Literature 1. As such, it is possible to carry out recording with a high density. No combination of four kinds of pieces of modulated data in Table 4 includes five consecutive 1's or 0's. Thus, in a case where unmodulated data sequentially includes "00" or "10"->"11"->"11"->"00" or "01," the "11"->"11" portion of the unmodulated data can be modulated into modulated data of "11111" (that is, a continuous recording region in which N is 5). In a case where unmodulated data sequentially includes "11" or "01"->"00"->"00"->"11" or "10," the "00"->"00" portion of the unmodulated data can be modulated into modulated data of "00000" (that is, a continuous recording region in which N is 5, which satisfies $N_{min}<N<2\times N_{min}$). With this modulation, 4-bit unmodulated data corresponds to 5 magnetic recording cells. This allows a continuous recording region to achieve "1-bit unmodulated data/1.25 cells," and thus further increases a recording density as compared to "1-bit unmodulated data/2.5 cells" above.

As described above, in a magnetic recording/reproduction device including a patterned medium that includes a plurality of magnetic recording cells magnetically isolated from one another, modulation is carried out for recording so that the patterned medium will include continuous recording regions that (i) satisfy $N_{min}\geq 2$ and that (ii) include continuous recording regions that satisfy $N\neq n\times N_{min}$, where $N_{min}$ represents a smallest value of the number of magnetic recording cells which are included in a continuous recording region and which are provided so as to differ from one another in location in the circumferential direction. As such, it is possible to simultaneously (i) prevent a decrease in recording density and (ii) correct an error caused by a defective cell.

(Variation 4)

The following description deals with a fourth variation of the first embodiment.

FIG. 7*a* is a diagram schematically illustrating an arrangement of a portion of a magnetic recording medium of variation 4. FIG. 7*b* is a diagram illustrating an arrangement of some of the magnetic recording cells 1. FIG. 7*b* illustrates a track Tr2 of FIG. 7*a* in detail. User data is not necessarily modulated and recorded as in the above embodiment and variations. As illustrated in FIGS. 7*a* and 7*b*, user data can alternatively be modulated and recorded, for example, as shown in Table 5 so that the magnetic recording cells 1 form continuous recording regions which include continuous recording regions that satisfy $N\neq n\times N_{min}$, as in 2 ($=N_{min}$), 3($\neq n\times N_{min}$), 4 ($=n\times N_{min}$), 5 ($\neq n\times N_{min}$), .... In the present variation also, recording is carried out so that the continuous recording regions include continuous recording regions that satisfy $N_{min}<N<2\times N_{min}$.

TABLE 5

| | | Magnetization directions of magnetic recording cells | |
| --- | --- | --- | --- |
| Unmodulated data | Modulated data | Magnetization direction of immediately preceding magnetic recording cell is U | Magnetization direction of immediately preceding magnetic recording cell is D |
| 10 | 100 | DDD | UUU |
| 01 | 001 | UUD | DDU |
| 11 | 010 | UDD | DUU |
| 00 | 000 | UUU | DDD |

First, unmodulated data (user data) represented by "1" and "0" is (i) divided into portions each including two digits and (ii) modulated into pieces of modulated data each of which pieces includes three digits as shown in Table 5. Recording in variation 4 is carried out, as shown in Table 5, so that (i) for modulated data "1," a target magnetic recording cell 1 is magnetized in a direction opposite to a direction of magnetization for a magnetic recording cell 1 immediately preceding the target magnetic recording cell 1, and that (ii) for modulated data "0," a target magnetic recording cell 1 is magnetized in a direction identical to a direction of magnetization for a magnetic recording cell 1 immediately preceding the target magnetic recording cell 1. For example, recording is carried out so that for modulated data "1," a target magnetic recording cell 1 is magnetized in (i) the "U" direction in a case where an immediately preceding magnetic recording cell 1 is magnetized in the "D" direction, and in (ii) the "D" direction in a case where the immediately preceding magnetic recording cell 1 is magnetized in the "U" direction. Further, recording is carried out so that for modulated data "0," a target magnetic recording cell 1 is magnetized in (i) the "U" direction in a case where an immediately preceding magnetic recording cell 1 is magnetized in the "U" direction, and in (ii) the "D" direction in a case where the immediately preceding magnetic recording cell 1 is magnetized in the "D" direction. Variation 4 thus achieves "1-bit unmodulated data/1.5 cells," which indicates that (i) the number of magnetic recording cells needed to record 1-bit data is smaller in the present variation than in Patent Literature 1 (disclosing "1-bit unmodulated data/2 cells"), and that (ii) the present variation consequently allows high-density recording.

The present variation, in which modulation is carried out so that "1" is always followed by "0" in modulated data as above, achieves $N_{min}=2$. In a case where "01" is followed by "10" in unmodulated data (hereinafter indicated by "01"->"10"), resulting modulated data would be "001100," which includes "11" and which thus results in $N_{min}=1$. For example, in a case where a magnetic recording cell 1 immediately preceding the above modulated data has an upward magnetization direction, respective magnetization directions of magnetic recording cells 1 corresponding to the modulated data would be "U, U, D, U, U, U," leaving "D" standing alone. To avoid this, modulation of the present variation is specially carried out as indicated below (m being an integer of 0 or greater) with use of "101," which is not included in Table 5 as modulated data.

[Unmodulated data] "01"->"10"xm->"10"
[Modulated data] "000"->"100"xm->"101"

For example, unmodulated data "0110," in which m=0, is modulated into "000101." Further, unmodulated data "01101010," in which m=2, is modulated into "000100100101." This modulation prevents modulated data from including "11," and thus prevents occurrence of a continuous recording region in which $N_{min}=1$.

As in the above embodiment, it is possible in the present variation as well to correct, during reproduction, an error caused by a defective cell. As described above, in a magnetic recording/reproduction device including a patterned medium that includes a plurality of magnetic recording cells magnetically isolated from one another, modulation is carried out for recording so that the patterned medium will include continuous recording regions that (i) satisfy $N_{min} \geq 2$ and that (ii) include continuous recording regions that satisfy $N \neq n \times N_{min}$, where $N_{min}$ represents a smallest value of the number of magnetic recording cells which are included in a continuous recording region and which are provided so as to differ from one another in location in the circumferential direction. As such, it is possible to simultaneously (i) prevent a decrease in recording density and (ii) correct an error caused by a defective cell.

In addition, the present variation has a constant ratio in bit count between unmodulated data and modulated data. As such, it is possible to further prevent occurrence of a reproduction error as compared to the first embodiment and variations 1 through 3.

Specifically, the magnetic recording medium 4 of the first embodiment includes regions of "1-bit unmodulated data/1.5 cells" and regions of "1-bit unmodulated data/2 cells." This may make it impossible to determine whether a defective magnetic recording cell in which a reproduction error has occurred is included in a region of "1-bit unmodulated data/1.5 cells" or a region of "1-bit unmodulated data/2 cells." This in turn makes it impossible to specify a border between recording units, and may thus affect reproduction of information recorded in magnetic recording cells that follow the defective magnetic recording cell. As such, the first embodiment, which thus requires more error correction patterns, may have a reduced recording capacity. Variation 4, in contrast, includes a magnetic recording medium 4 which has only regions of "1-bit unmodulated data/1.5 cells." As such, it is possible to specify a border between recording units in a case where a reproduction error has occurred in a magnetic recording cell. This reduces influence of a reproduction error on reproduction of information included in recording units that follow the defective magnetic recording cell. As described above, the present variation further prevents occurrence of a reproduction error by using an equal number of magnetic recording cells for each piece of unmodulated data, that is, an equal number of magnetic recording cells for recording 1-bit user data.

The modulation method is not limited to the above method. Alternatively, for example, each 2-bit unmodulated data can be modulated into 4-bit modulated data to be recorded in the magnetic recording cells 1 so that, as shown in Table 6, (i) a shortest continuous recording region has $N_{min}$ of 3, and (ii) the magnetic recording medium 4 will include magnetic recording regions in which N is 4 or 5. This achieves "1-bit unmodulated data/2 cells."

TABLE 6

| | | Magnetization directions of magnetic recording cells | |
|---|---|---|---|
| Unmodulated data | Modulated data | Magnetization direction of immediately preceding magnetic recording cell is U | Magnetization direction of immediately preceding magnetic recording cell is D |
| 10 | 1000 | DDDD | UUUU |
| 01 | 0010 | UUDD | DDUU |
| 11 | 0100 | UDDD | DUUU |
| 00 | 0000 | UUUU | DDDD |

In a case where "01" is followed by "10" in unmodulated data (hereinafter indicated by "01"->"10"), resulting modulated data would be "00101000," which includes "101" and which thus results in $N_{min}=2$. To avoid this, modulation of the present variation can also be specially carried out as indicated below with use of "0001," which is not included in Table 6 above as modulated data.

[Unmodulated data] "01"->"10"
[Modulated data] "0001"->"0000"

Unmodulated data "0110" is thus modulated into modulated data "00010000." This prevents occurrence of a continuous recording region in which $N_{min}<3$.

As described above, in a case where recording is carried out so that the magnetic recording medium 4 will include continuous recording regions that (i) satisfy $N_{min} \geq 2$ and that (ii) include continuous recording regions that satisfy $N \neq n \times N_{min}$, it is possible to prevent a decrease in recording density and to correct an error caused by a defective cell.

Second Embodiment

The following description deals with a second embodiment of the present invention with reference to FIGS. 8 through 11.

Members of the present embodiment that are identical to their respective equivalents in the first embodiment are assigned identical reference numerals, and are not described here in detail. The present embodiment is identical to Embodiment 1 in device configuration, but differs from it in that recording and reproduction are carried out with use of a track formed of two lines of magnetic recording cells 1.

Figure 8A:
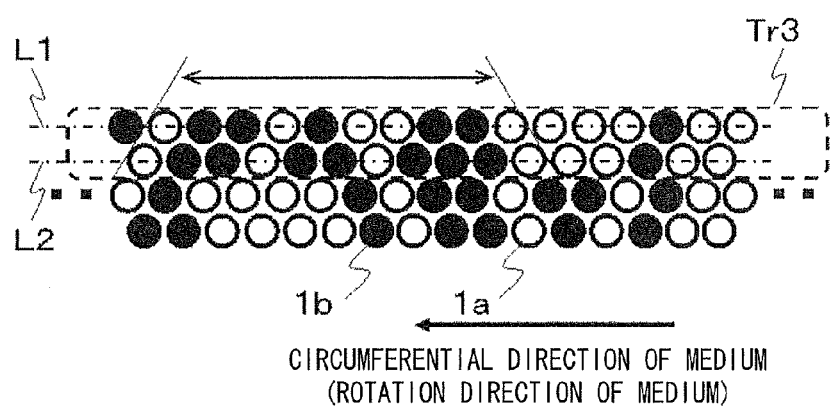
FIG. 8a is a diagram schematically illustrating an arrangement of a part of the magnetic recording medium of a second embodiment.
Figure 8B:
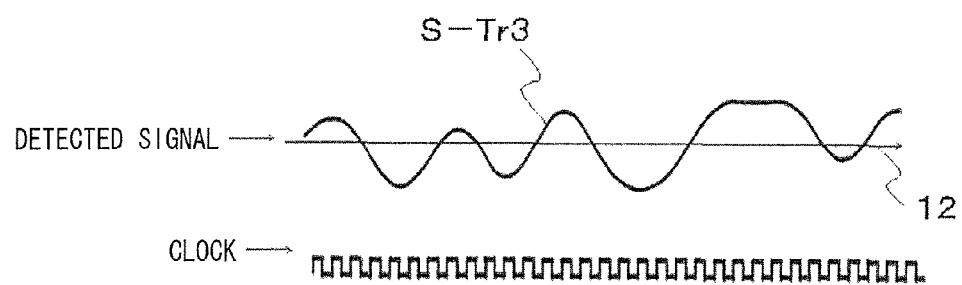
FIG. 8b is a diagram illustrating a detection signal in accordance with the second embodiment.

FIG. 8a is a diagram schematically illustrating particular ones of the magnetic recording cells 1 of the magnetic recording medium 4 included in a magnetic recording/reproduction device 2 of the present embodiment. FIG. 8b is a diagram schematically illustrating a waveform of a signal detected from the particular magnetic recording cells 1. The description below deals with a magnetic recording/reproduction device 2 which reproduces information from a track Tr3 formed of two magnetic recording cell lines L1 and L2 as illustrated in FIG. 8a.

Figure 9:
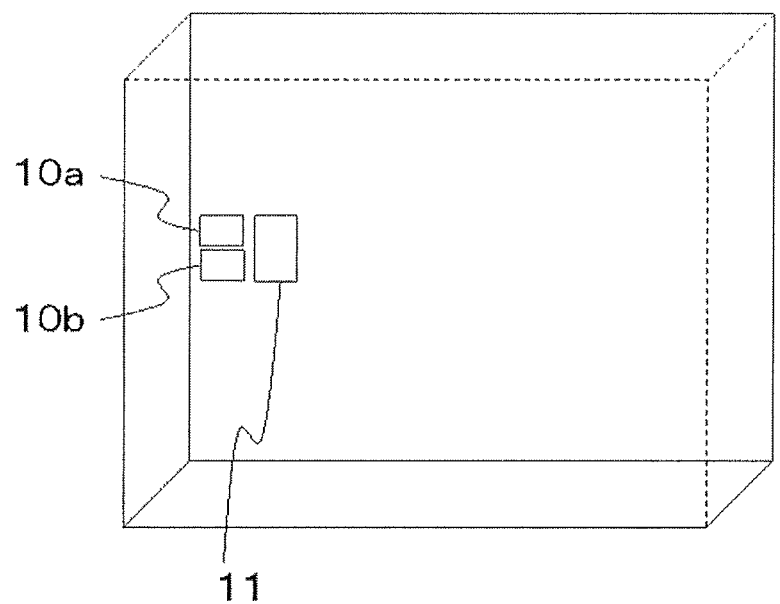
FIG. 9 is a diagram schematically illustrating a configuration of a recording/reproduction head of the second embodiment.

FIG. 9 is a diagram schematically illustrating a configuration of a recording/reproduction head 7a. As illustrated in FIG. 9, the recording/reproduction head 7a includes magnetic recording elements 10a and 10b and a magnetic reproduction element 11. The magnetic recording elements 10a and 10b serve to record information in the magnetic recording cell lines L1 and L2, respectively. The magnetic reproduction element 11 serves to detect leakage magnetic fields from the respective magnetic recording cell lines L1 and L2 in a single scan. The magnetic reproduction element 11 alternates between the magnetic recording cell lines L1 and L2 in detecting a signal from the magnetic recording cells 1. In the present embodiment, (i) each magnetic recording cell 1 in a magnetic recording cell line L1 is adjacent to two magnetic recording cells 1 in the circumferential direction, the two magnetic recording cells 1 each being a magnetic recording cell 1 in a magnetic recording cell line L2, and (ii) each magnetic recording cell in a magnetic recording cell line L2 is adjacent to two magnetic recording cells 1 in the circumferential direction, the two magnetic recording cells 1 each being a magnetic recording cell 1 in a magnetic recording cell line L1. The diagram of FIG. 8b schematically illustrating a detected waveform which reflects influence of intersymbol interference.

Figure 10A:
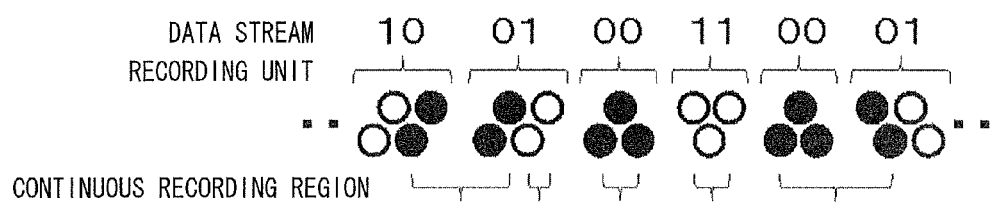
FIG. 10a is a diagram illustrating some magnetic recording cells of the magnetic recording medium of the second embodiment.
Figure 10B:
FIG. 10b is a diagram illustrating correspondence between unmodulated data and respective magnetization directions of the magnetic recording cells in recording units in accordance with the second embodiment.

FIG. 10a is a diagram illustrating some of the magnetic recording cells 1 of the magnetic recording medium 4. FIG. 10b is a table showing correspondence between (i) unmodulated data and (ii) respective magnetization directions of magnetic recording cells in a corresponding recording unit. User data (unmodulated data) is modulated in the present embodiment by the method as shown in Table 1 of the first embodiment. The method is, however, different in that since the track Tr3 is formed of the magnetic recording cell lines L1 and L2, the method involves use of two magnetic recording cell lines for each piece of unmodulated data as illustrated in FIG. 10b. With this method, a portion of the track Tr3 which portion is indicated by a double-headed arrow in FIG. 8a results from modulating and recording unmodulated data "100100110001." The magnetic recording elements 10a and 10b then record resulting modulated data in their respective cell lines. This makes it possible to carry out recording as illustrated in FIG. 10a.

The magnetic reproduction element 11 alternates between the magnetic recording cell lines L1 and L2 in detecting a signal from the magnetic recording cells 1. This substantially reduces a pitch of the magnetic recording cells 1 in the circumferential direction, and thus increases intersymbol interference as compared to the case in which recording and reproduction are carrying out with respect to a single cell line at a time as in the first embodiment. As such, the detected signal has a blurred waveform as illustrated in the schematic diagram of FIG. 8b.

Figure 11A:
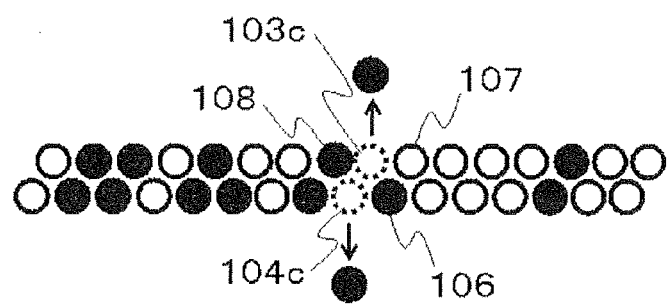
FIG. 11a is a diagram schematically illustrating some of the magnetic recording cells of the magnetic recording medium of the second embodiment.
Figure 11B:
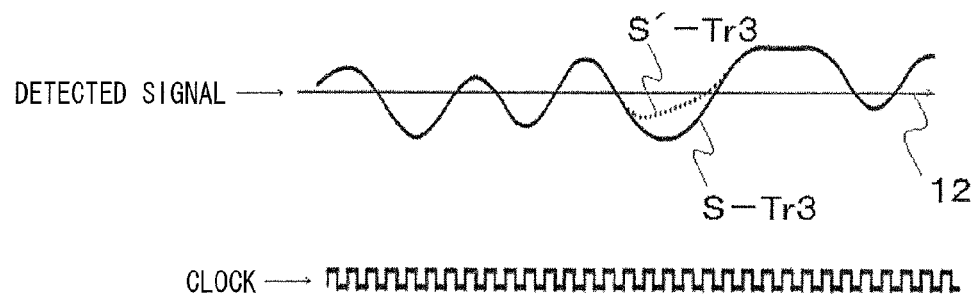
FIG. 11b is a diagram schematically illustrating the error correction method of the second embodiment.

FIG. 11a is a diagram schematically illustrating some of the magnetic recording cells 1 of the magnetic recording medium 4. FIG. 11b is a diagram schematically illustrating an error correction method. The following description deals with how a reproduction signal is corrected in a case where the magnetic recording cells 1 include a defective cell.

The description below deals with a correction method carried out in a case where the magnetic reproduction element 11 has detected defective cells 103c and 104c, for each of which a magnetization direction cannot be determined as illustrated in FIG. 11a. First, magnetic recording cells 106 and 107 differ from each other in magnetization direction. The magnetic recording cell 106 is adjacent to the defective cell 103c in the circumferential direction. The magnetic recording cell 107 is adjacent to the magnetic recording cell 106 in the circumferential direction. Since the magnetic recording cells 1 of the present embodiment form no continuous recording region in which N is 1, the defective cell 103c can be determined as identical to the magnetic recording cell 106 in magnetization direction.

Then, the defective cell 104c is adjacent in the circumferential direction to the following two magnetic recording cells: (i) the defective cell 103c having a magnetization direction determined by the above correction and (ii) a magnetic recording cell 108 having a magnetization direction identical to that of the defective cell 103c. As such, it is possible to determine that the defective cell 104c has a magnetization direction identical to that of the magnetic recording cell 108. As a result, even in a case where the magnetic recording medium 4 includes two defective cells adjacent to each other in the circumferential direction, it is possible to (i) determine on the basis of a detection signal S'-Tr3 in FIG. 11b that a detection signal actually has a waveform identical to that of a signal indicated by S-Tr3 in FIG. 11b, and thus to (ii) decode recorded data.

A third embodiment below will describe how the magnetic reproduction element 11 determines existence of a defective cell such as the defective cells 103c and 104c from a detection signal such as the detection signals S'-Tr3 and S"-Tr3.

Third Embodiment

The present embodiment deals with a magnetic recording/reproduction device 2 including a magnetic recording medium 4 that has (i) a user data recording region and (ii) a test read region which is arranged in advance to generate a signal having a sample waveform.

Figure 12:
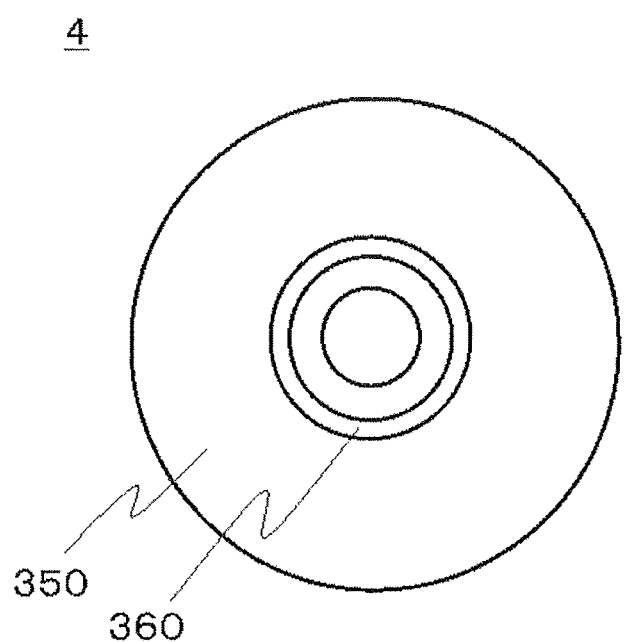
FIG. 12 is a diagram schematically illustrating a configuration of a magnetic recording medium of a third embodiment.

FIG. 12 is a diagram schematically illustrating a magnetic recording medium 4 of the third embodiment. As illustrated in FIG. 12, the magnetic recording medium 4 includes a user data recording region 350 and a test read region 360.

Figure 13A:
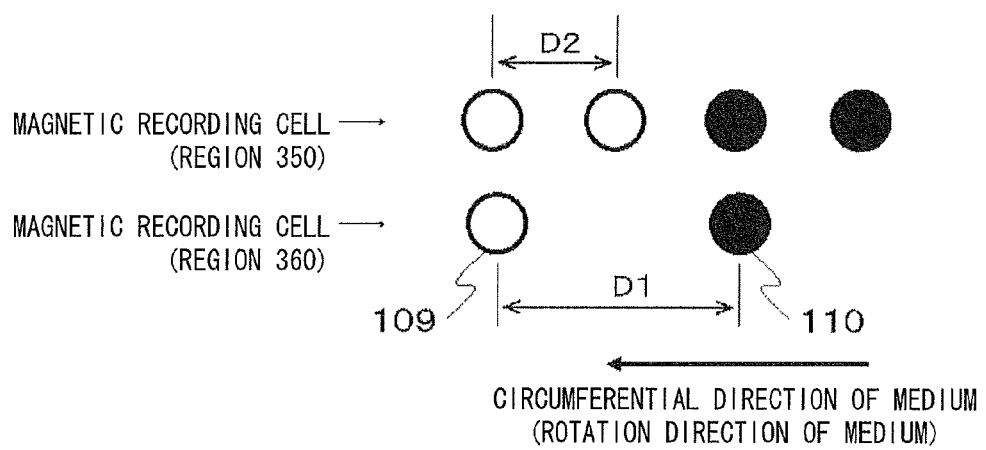
FIG. 13a is a diagram illustrating some magnetic recording cells of the magnetic recording medium of the third embodiment.
Figure 13B:
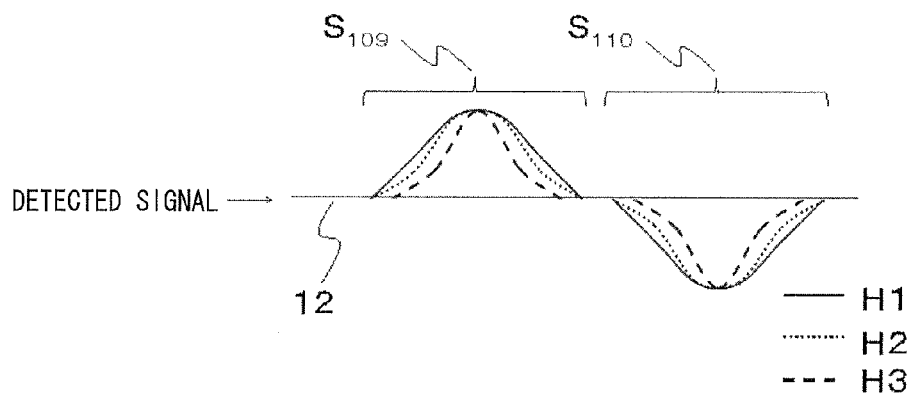
FIG. 13b is a diagram illustrating a detection signal in accordance with the third embodiment.

FIG. 13a is a diagram illustrating a portion of the magnetic recording medium 4 having a test read region and included in the magnetic recording/reproduction device 2 of the third embodiment. FIG. 13b is a diagram illustrating a detection signal. As illustrated in FIG. 13a, the magnetic recording medium 4 includes, in the test read region 360, magnetic recording cells 1 arranged so as to have a pitch D1 in a circumferential direction. The magnetic recording cells 1 in the test read region 360 are each identical in shape to magnetic recording cells 1 in the user data recording region 350. The magnetic recording cells 1 in the test read region 360 include a magnetic recording cell 109 having an upward magnetization direction and a magnetic recording cell 110 having a downward magnetization direction. Further, the magnetic recording cells 1 in the region 350 for recording and reproduction of user data are arranged so as to have a pitch D2 in the circumferential direction. The pitch D1 is larger than the pitch D2. This prevents the magnetic reproduction element 11 from detecting a signal affected by intersymbol interference in the circumferential direction.

FIG. 13b illustrates a signal detected by the magnetic reproduction element 11 scanning the magnetic recording cells 1. The description below uses the term "Scell" to refer to a detection signal which is detected from the test read region 360 and which corresponds to a single magnetic recording cell 1 and is thus free from intersymbol interference. Further, the description uses (i) the term $S_{109}$ to refer to a signal Scell detected from the magnetic recording cell 109 having an upward magnetization direction and (ii) the term $S_{110}$ to refer to a signal Scell detected from the magnetic recording cell 110 having a downward magnetization direction. FIG. 13b illustrates example detection signals H1, H2, and H3 which are different from one another depending on difference in such factors as (i) size of the magnetic recording cells 109 and 110 and (ii) resolution and frequency responsiveness of the magnetic reproduction element 11. The present embodiment first determines a spatial distribution of each of $S_{109}$ and $S_{110}$ in the circumferential direction. The present embodiment then causes the signals Scell to have the pitch D2 and thus causes the respective spatial distributions of the signals Scell to overlap each other so as to obtain a detection signal (hereinafter referred to as "Sread") from a recording track. The magnetic recording/reproduction device 2 includes a waveform equalizer (not shown) which, for more accurate data decoding, (i) carries out the above steps to predict a detection signal that reflects intersymbol interference and (ii) adjusts a signal actually detected, which includes noise and the like, so as to cause the signal to have a waveform identical to a waveform predicted.

The description below assumes the following: $t_1, t_2, \ldots, t_n$ respectively represent times at which signals are actually detected; $r_1, r_2, \ldots, r_n$ respectively represent values obtained by digitally converting the signals at the above times; and the waveform equalizer predicts two waveform patterns for the times $t_1, t_2, \ldots, t_n$, the two waveform patterns having (i) values $p_1, p_2, \ldots, p_n$, and (ii) values $q_1, q_2, \ldots, q_n$, respectively. The waveform equalizer carries out the above adjustment specifically by, for example, (i) comparing a value of $\Sigma(p_n-r_n)^2$ with a value of $\Sigma(q_n-r_n)^2$ to find a smaller one of the two values and (ii) causing a detection signal to have one of the two waveform patterns which corresponds to the expression having the smaller value. In a case where the waveform equalizer predicts three waveform patterns or more, the waveform equalizer similarly carries out the adjustment by causing a detection signal to have one of the waveform patterns which corresponds to a sum of squares of differences, the sum having a smallest value.

The waveform equalizer transmits the processed signal to a decoding section (not shown), which then decodes the modulated data into unmodulated data.

FIG. 14a through FIG. 14c each illustrate an example of intersymbol interference occurring in the magnetic recording/reproduction device 2 of the third embodiment. FIG. 14a through FIG. 14c each illustrate (i) respective waveforms of signals Scell detected from individual magnetic recording cells 1 and (ii) a waveform of a signal Sread obtained by overlapping respective spatial distributions of the signals Scell. FIG. 14a through FIG. 14c each illustrate, as an example, four waveform portions which are from left to right (i) a waveform portion H (U, U) corresponding to two consecutive magnetic recording cells 1 each having an upward magnetization direction, (ii) a waveform portion H (U, U, U) corresponding to three consecutive magnetic recording cells 1 each having an upward magnetization direction, (iii) a waveform portion H (U, U, U, U, U, U) corresponding to six consecutive magnetic recording cells 1 each having an upward magnetization direction, and (iv) a waveform portion H (U, U, D, D, D) corresponding to two consecutive magnetic recording cells 1 each having an upward magnetization direction and three consecutive magnetic recording cells 1 each having a downward magnetization direction. Intersymbol interference increases as illustrated in FIG. 14a in a case where the magnetic recording cells 1 have a smaller pitch in the circumferential direction with respect to spatial resolution and frequency responsiveness of the magnetic reproduction element 11 in the circumferential direction. Intersymbol interference decreases as illustrated in FIG. 14c in a case where the magnetic recording cells 1 have a larger pitch in the circumferential direction with respect to spatial resolution and frequency responsiveness of the magnetic reproduction element 11 in the circumferential direction. FIG. 14b illustrates a waveform obtained in a case where the magnetic recording cells 1 have a pitch in the circumferential direction, the pitch being approximately an intermediate between that of FIG. 14a and that of FIG. 14c, with respect to spatial resolution and frequency responsiveness of the magnetic reproduction element 11 in the circumferential direction. The waveform equalizer carries out the above steps to select, depending on a waveform of a signal actually detected, a combination of (i) suitable spatial distributions, in the circumferential direction, of respective signals detected from individual magnetic recording cells 1 and (ii) a method for overlapping the spatial distributions. The waveform equalizer then processes the signal actually detected.

The term "continuous recording region" as used in the present specification refers to a group of regularly arranged magnetic recording cells 1 which are identical to one another in shape and magnetization direction. While each magnetic recording cell 1 generates a leakage magnetic field in either of two magnetization directions, an overall leakage magnetic field can be regarded as being formed by overlapping the respective leakage magnetic fields of the individual magnetic recording cells 1. As such, in a case where the magnetic recording cells 1 include a defective cell, the magnetic reproduction element 11 detects an overall leakage magnetic field which lacks a portion corresponding to a leakage magnetic field which the defective cell would otherwise generate.

The above arrangement facilitates (i) specifying, during reproduction, a location of a defective cell in a case where a detection signal affected by intersymbol interference lacks a portion corresponding to the defective cell, and thus (ii) carrying out the above error correction. In a case where, for example, the magnetic reproduction element 11 has detected, during reproduction, a signal which lacks a portion corresponding to a signal Scell, that is, one of $S_{109}$ and $S_{110}$, it is possible to (i) determine existence of the defective cell and a location thereof, and consequently to (ii) carry out the error correction described in either of the first embodiment, its variations, and the second embodiment.

In a patterned medium, a magnetically isolated magnetic recording cell 1 may, as described above, become defective on its own independently of a magnetic recording cell 1 that precedes or follows the magnetic recording cell 1. In such a patterned medium, however, magnetically isolated magnetic recording cells 1 are regularly arranged unlike in a conventional granular medium or discrete track medium. As such, it is possible to (i) predict a change in detected waveform which change is caused by a defective cell, and consequently to (ii) carry out error correction with use of the predictability.

Since the magnetic recording medium 4 includes a test read region 360, the magnetic recording/reproduction device 2 can determine on the basis of an actual measurement taken without much intersymbol interference a model spatial distribution, in the circumferential direction, of a signal detected from each individual magnetic recording cell 1. As such, it is possible to (i) more accurately equalize a waveform and make the above determination about a defective cell, and consequently to (ii) more accurately decode data and reduce occurrence of a reproduction error.

The above description does not limit the method for selecting a combination of (i) spatial distributions, in the circumferential direction, of respective signals detected from the individual magnetic recording cells 1 and (ii) a method for overlapping the spatial distributions. The magnetic recording medium 4 thus does not necessarily have a test read region, for example. In this case, the determination method can be such that the memory section stores in advance a plurality of patterns of a combination of (i) spatial distributions, in the circumferential direction, of respective signals detected from the individual magnetic recording cells 1 and (ii) a method for overlapping the spatial distributions, and that the magnetic recording/reproduction device 2 selects, on the basis of a waveform of a signal actually detected, a combination of (i) suitable spatial distribution, in the circumferential direction, of respective signals detected from the individual magnetic recording cells 1 and (ii) a method for overlapping the spatial distributions. With this arrangement, it is possible to (i) use as a user data recording region a region corresponding to the above test read region, and consequently to (ii) increase a user data recording capacity.

Further, it is also possible to overlap respective leakage magnetic fields of the individual magnetic recording cells 1 in accordance with a cycle of a clock signal generated on the basis of a detection signal. With this arrangement, it is possible to equalize a waveform on the basis of spatial distributions of respective signals detected from the individual magnetic recording cells 1 which spatial distributions are overlapped in the circumferential direction so as to correspond to a linear velocity at which actual reproduction is being carried out. As such, it is possible to reduce occurrence of a reproduction error caused in a case where a linear velocity changes.

The above embodiments and variations can each alternatively be carried out so as to perform an operation identical to the above with use of any other magnetic recording/reproduction device including a magnetic recording medium having a recording surface on which a plurality of magnetic recording cells magnetically isolated from one another are arranged. The above advantage of carrying out recording so that (i) a recording density is high and (ii) an error correction can be carried out is also achieved with use of, for example, an energy-assisted magnetic recording/reproduction device which uses an energy such as light, heat, and a microwave. An energy-assisted magnetic recording/reproduction device which uses light or heat, in particular, is likely to lose magnetization in its magnetic recording cells due to, for example, oxidation as it is heated and cooled repeatedly during its repeated use. In a case where the present invention is applied to an energy-assisted magnetic recording/reproduction device which uses light or heat, it is possible, in particular, to reduce occurrence of a reproduction error.

The embodiments and examples disclosed herein are in all respects for illustrative purposes only, and by no means limit the scope of the present invention. The scope of the present invention is defined not by the description above but by the patent claims below, and intends to encompass equivalents, in meaning, of the patent claims and any variation within the scope.

The present invention can also be arranged as below.

The magnetic recording/reproduction device of the present invention may be arranged such that the continuous recording regions include a continuous recording region that satisfies $N_{min}<N<2\times N_{min}$.

The magnetic recording/reproduction device of the present invention may be arranged such that in a case where a first magnetic recording cell is a defective cell, the magnetic recording and reproduction device determines, if a second magnetic recording cell has a magnetization direction identical to a magnetization direction of a third magnetic recording cell, that the first magnetic recording cell has a magnetization direction identical to the magnetization direction of the second magnetic recording cell, the first magnetic recording cell being one of the plurality of magnetic recording cells, the second magnetic recording cell and the third magnetic recording cell being two magnetic recording cells adjacent to the first magnetic recording cell in the circumferential direction.

The magnetic recording/reproduction device of the present invention may be arranged such that in a case where a first magnetic recording cell is a defective cell, the magnetic recording and reproduction device determines, if a second magnetic recording cell has a magnetization direction different from a magnetization direction of a fourth magnetic recording cell, that the first magnetic recording cell has a magnetization direction identical to the magnetization direction of the second magnetic recording cell, the first magnetic recording cell being one of the plurality of magnetic recording cells, the second magnetic recording cell being one of two magnetic recording cells adjacent to the first magnetic recording cell in the circumferential direction, the fourth magnetic recording cell being (i) one of two magnetic recording cells adjacent to the second magnetic recording cell in the circumferential direction and (ii) different from the first magnetic recording cell.

The magnetic recording/reproduction device of the present invention may be arranged such that a number of magnetic recording cells is identical per 1-bit user data.

The magnetic recording/reproduction device of the present invention may be arranged such that the reproducing means includes waveform equalizing means for determining a combination of (i) spatial distributions, in the circumferential direction, of respective signals detected individually from the plurality of magnetic recording cells and (ii) a method for overlapping the spatial distributions.

The magnetic recording/reproduction device of the present invention may be arranged such that D1>D2, where D1 represents a pitch, in the circumferential direction, of magnetic recording cells in the test read region; and D2 represents a pitch, in the circumferential direction, of magnetic recording cells in a region for recording and reproduction of user data.

A magnetic recording medium of the present invention is a magnetic recording medium having a recording surface on which a plurality of magnetic recording cells magnetically isolated from one another are arranged, the magnetic recording medium including a test read region which allows magnetic reproducing means of a magnetic recording and reproduction device to measure spatial distributions, in a circumferential direction of the magnetic recording medium, of respective signals detected individually from the plurality of magnetic recording cells.

INDUSTRIAL APPLICABILITY

The present invention is suitably applicable to, for example, (i) a magnetic recording medium, such as a patterned medium, which includes magnetic recording cells and (ii) a magnetic recording/reproduction device including such a magnetic recording medium.

REFERENCE SIGNS LIST

- 1, 1a, 1b magnetic recording cell
- 2 magnetic recording/reproduction device
- 3 control section
- 4 magnetic recording medium
- 5 spindle
- 6 suspension
- 7, 7a recording/reproduction head
- 8 voice coil motor
- 9 ramp mechanism
- 10 magnetic recording element
- 11 magnetic reproduction element
- 12 zero level of a signal detected
- 101-110 magnetic recording cell
- 101c-104c defective cell
- 350 user data recording region
- 360 test read region
- 410 glass substrate
- 420 soft magnetic layer
- 430 resist
- 440 material of which magnetic recording cells 1 are to be made

The invention claimed is:

1. A magnetic recording and reproduction device, comprising:

recording means for generating a magnetic field so as to record information in a plurality of magnetic recording cells which are arranged on a recording surface of a magnetic recording medium and which are magnetically isolated from one another; and reproducing means for detecting a leakage magnetic field of each of the plurality of magnetic recording cells so as to reproduce information, the recording means carrying out the recording on the magnetic recording medium so that the magnetic recording medium includes continuous recording regions that (i) satisfy $N_{min} \geq 2$ and that (ii) include a continuous recording region that satisfies $N \neq n \times N_{min}$, where N represents a number of magnetic recording cells in a continuous recording region; $N_{min}$ represents a minimum value for N; and n represents a positive integer, the continuous recording regions each being a region on a reproduction track in which region magnetic recording cells sharing an identical magnetization direction are sequentially arranged in a circumferential direction of the magnetic recording medium, wherein:

the magnetic recording medium includes a test read region which allows the reproducing means to measure spatial distributions, in the circumferential direction, of respective signals detected individually from the plurality of magnetic recording cells, and wherein:

D1>D2, where D1 represents a pitch, in the circumferential direction, of magnetic recording cells in the test read region; and D2 represents a pitch, in the circumferential direction, of magnetic recording cells in a region for recording and reproduction of user data.

2. The magnetic recording and reproduction device according to claim 1, wherein:

the continuous recording regions include a continuous recording region that satisfies $N_{min} < N < 2 \times N_{min}$.

3. The magnetic recording and reproduction device according to claim 1, wherein:

a number of magnetic recording cells is identical per 1-bit user data.

4. The magnetic recording and reproduction device according to claim 1, wherein:

(i) spatial distributions, in the circumferential direction, of respective signals detected individually from the plurality of magnetic recording cells and (ii) overlapping the spatial distributions.

* * * * *